Sept. 13, 1960      D. F. HOWARD      2,952,774
RADIATION FUEL GAUGE

Filed Sept. 28, 1953      4 Sheets-Sheet 1

INVENTOR.
DONALD F. HOWARD
BY
William R. Lane
ATTORNEY

INVENTOR.
DONALD F. HOWARD
BY
William P. Lane
ATTORNEY

INVENTOR.
DONALD F. HOWARD
BY
ATTORNEY

Sept. 13, 1960　　　D. F. HOWARD　　　2,952,774
RADIATION FUEL GAUGE

Filed Sept. 28, 1953　　　　　　　　　4 Sheets-Sheet 4

*INVENTOR.*
DONALD F. HOWARD

BY

*William R. Lane*

ATTORNEY

United States Patent Office 2,952,774
Patented Sept. 13, 1960

2,952,774

RADIATION FUEL GAUGE

Donald F. Howard, North Long Beach, Calif., assignor to North American Aviation, Inc.

Filed Sept. 28, 1953, Ser. No. 382,589

10 Claims. (Cl. 250—43.5)

This invention relates to fuel gauges and particularly to a device for measuring the mass of fluid in a plurality of irregularly-shaped aircraft fuel tanks by the use of radiation.

In the past, the quantity of fuel in aircraft fuel tanks has been measured by some sort of float or capacitive type gauge contained within the tank the output of which was necessarily calibrated to compensate for the fact that the tank, as most aircraft fuel tanks are, is of irregular shape. Due to space requirements in aircraft, the space available for fuel storage is normally of odd shape, conforming in some cases to the outside contour of a part of the airplane such as the wing and in other cases to space left free by the propulsion system or the pilot compartment in the fuselage. The tanks are frequently of U-shaped configuration or irregular somewhat parallelepipedal shape. Accordingly, in the past, each tank configuration required a special characterization to assure that a linear indication of fuel content could be achieved. Additionally the fuel measuring devices utilized measure the volume and not mass. Modern aircraft, however, encounters such a variety of ambient temperature conditions that the volume of the fuel in the tank can no longer be said to be related linearly to its mass.

Another disadvantage of previously known fuel quantity measuring systems stems from the necessity of inserting some kind of sensory instrument in the tank, thus raising problems of sealing around the opening for such insertion and the construction problems incident to forming the opening and the covering therefor.

This invention contemplates a system for measuring the mass of fuel or other fluid in an irregularly-shaped container without entering the container with any type of sensory instrument. This invention further contemplates measurement of the mass of fluid in such an irregularly-shaped container despite changes in density of the fluid produced by temperature changes.

It is therefore an object of this invention to provide means for measuring the mass of fluid contained in a plurality of irregularly-shaped containers.

It is another object of this invention to provide an apparatus for measuring the mass of a fluid in a container irrespective of the changes in density of the fluid contained therein.

It is another object of this invention to provid means for measuring the mass of fluid in a container by the use of apparatus external of said container.

It is another object of this invention to provide means for measuring the total fluid content of a plurality of differently-shaped, irregularly-shaped containers by means situated outside said containers.

It is another object of this invention to provide electrical means for measuring the mass of fluid in a plurality of irregularly-shaped containers with compensation for the shape of said container introduced electrically.

Other objects of invention will become apparent from the following description taken in connection with the accompanying drawings, in which Fig. 1 is a perspective view of a typical installation of irregularly-shaped aircraft fuel tanks;

Figure 7:
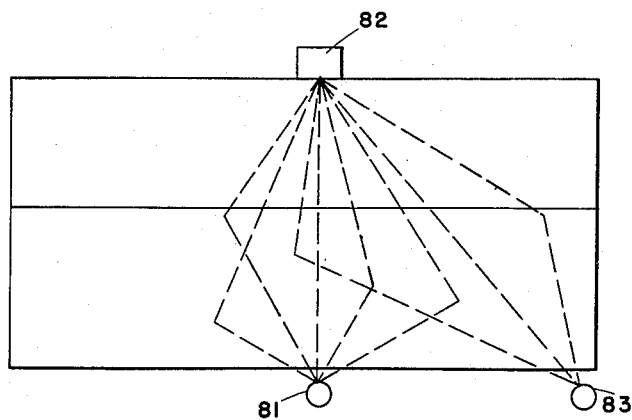

And Fig. 7 is a cross-sectional view of a fuel tank with typical placements of radiation sources and detectors.

Figure 1:
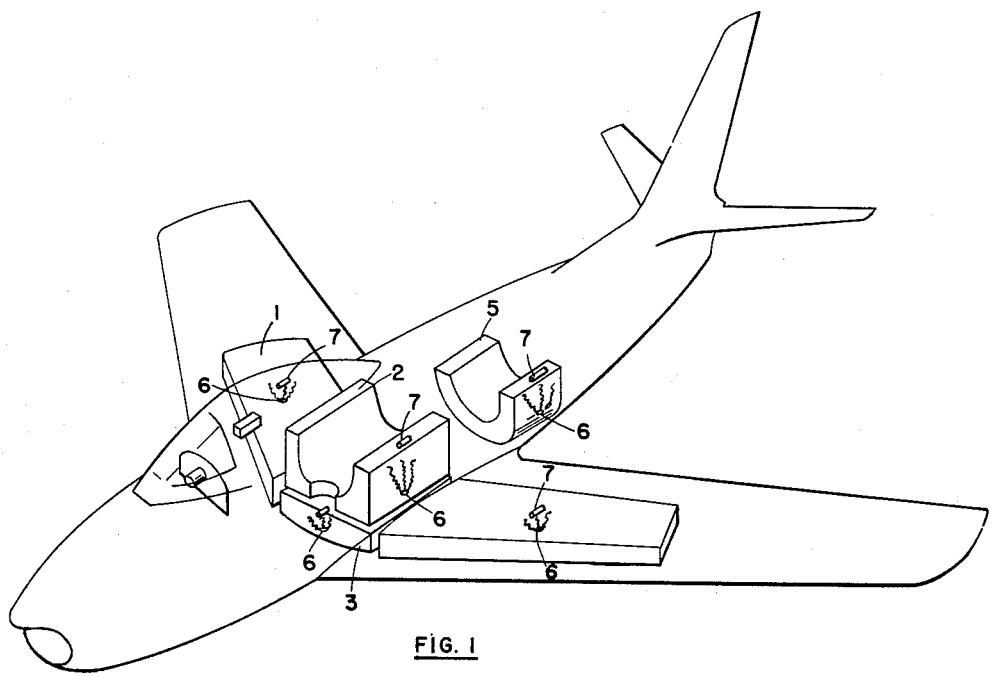

Referring to the drawings and particularly to Fig. 1, tanks 1, 2, 3, 4, and 5 of generally differing shape are shown in the positions normally carried in a typical modern airplane. The shape of these tanks is determined by the space arrangement as determined by the mass of equipment required to be carried by the airplane and the external contours of the airplane as determined by aerodynamic considerations. For simplicity, in Fig. 1, electrical connections have been omitted. In Fig. 1, a radio-active source 6 is disposed beneath each tank while a radiation detector 7 is placed above each tank. In practice more than one source is normally used beneath each tank to compensate for variations in attitude of the airplane. Additional radioactive sources may be employed and, if they are employed, it is preferable that they be disposed at the ends or sides of the tanks.

Figure 2:
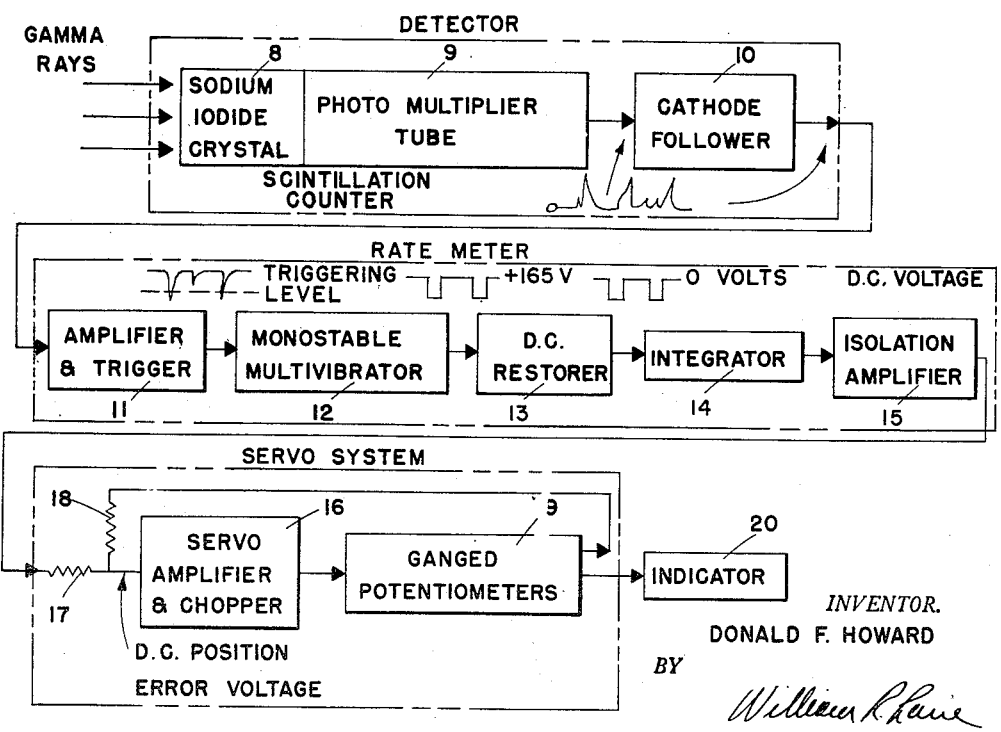
Fig. 2 is a block diagram of the invention.

Referring now to Fig. 2, there is shown a block diagram including the circuit from one radiation detector to the fuel mass indicator. The radioactive source contemplated for this invention is a source of gamma radiation such as radioactive cobalt (Cobalt 60), Cesium 137, radium, or some other source of gamma radiation having a reasonably long half-life to eliminate the necessity for frequent replacement of the source. Since each source is disposed beneath the tank, radiation from the source reaches the detector only through the tank and contents thereof. Attenuation of the radiation is then a function of the depth of the fluid in the tank or, more specifically, the thickness (expressed in mass per unit area) of material through which the radiation must pass in reaching the detector. Gamma radiation has the unusual property that its mass absorption coefficient is approximately constant, that is, the extent to which the radiation is attenuated in passing through the substance is dependent upon the product of the thickness through which the radiation passes and the density of the material. Consequently, it follows that should the fuel or fluid in the container or tank vary in density due to changes in temperature, the attenuation as detected by the detector remains substantially constant. Radiation then falls upon a material in the detector which has the property of emitting light when encountered by gamma rays such as a sodium iodide crystal 8 which, in turn, is optically coupled to the sensitive face of photomultiplier tube 9. The output of photomultiplier 9 is connected to cathode-follower 10 whose output, in turn, is connected to the input of amplifier 11 which triggers monostable multivibrator 12 whose pulse rate is proportional to the number of incident gamma rays upon crystal 8 per unit time. The output of multivibrator 12, however, does not depend upon the energy level of the incident gamma rays so long as the output of amplifier 11 is sufficient to exceed the signal threshold of multivibrator 12. The output of multivibrator 12 is fed to D.-C. restorer 13 and thence to integrator 14. The output of integrator 14 is fed to the input of amplifier 15 whose function is to isolate the rate meter circuit from the servo system which receives its signal from amplifier 15. Servo amplifier 16 receives its input through resistor 17 and resistor 18 which feeds back a portion of the output of ganged potentiometer 19 to the input of amplifier 16. One output of ganged potentiometer 19 is fed to indicator 20 which then indicates the mass of fuel in the tank.

The preceding discussion of the block diagram of Fig. 2 is a simplified exposition of the operation of the circuit from the radiation source through to the integrator for a single tank. However, it is desired to measure the mass of fluid not in a single tank but the total mass of fluid in a plurality of irregularly-shaped tanks the various shapes of which may differ from each other markedly. Obviously due to the arrangement heretofore set forth, indicator 20 would have to be calibrated to compensate for irregular shapes possessed by the particular tank in question. Alternatively a corresponding non-linearity would have to be introduced somewhere in the rate meter or servo system. In practice, this non-linearity can be introduced in the arrangement of Fig. 2 of the invention with a single tank in the arrangement of ganged potentiometer 19 where a linear potentiometer is driven by a motor driven by amplifier 16 and feeds a portion of its output back to resistor 18 until the output of the linear potentiometer matches the signal received through resistor 17 from the rate meter. A non-linear potentiometer whose non-linearity is predetermined in accordance with the specific shape of the tank or container is driven by the same shaft that drives the linear potentiometer. The output of the non-linear potentiometer is fed to indicator 20 to provide an indication of the mass of fluid actually in the container. Alternatively, a plurality of radiation sources may be disposed about the irregularly-shaped container so that the total radiation received by the detector varies almost linearly with the mass of fluid in the container. In this case, the output of the rate meter may be fed directly to indicator 20.

Figure 3:
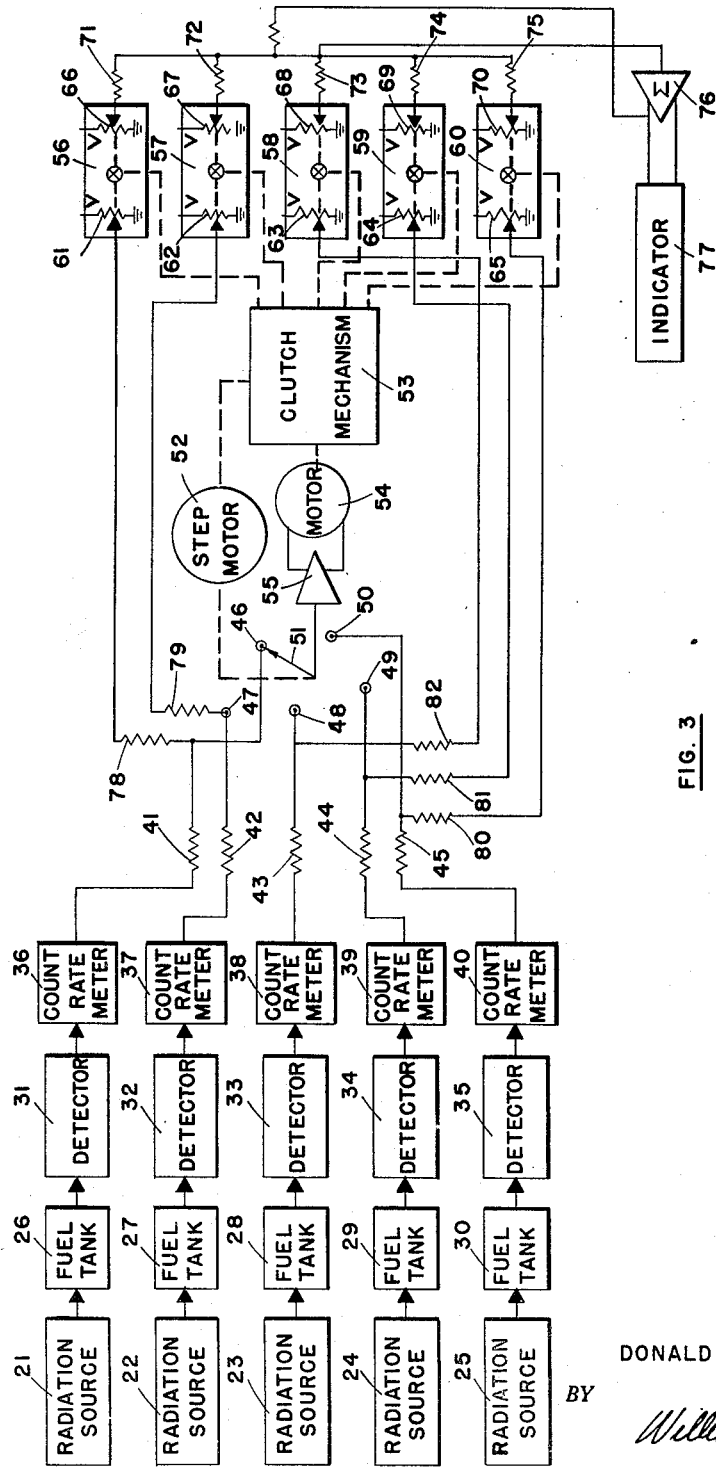
Fig. 3 is a detailed electrical schematic of the invention.

To determine the total mass of fluid in a plurality of irregularly-shaped containers whose individual shapes differ markedly from each other without utilizing a number of indicators and servo arrangements equal to the number of tanks, the arrangement of Fig. 3 is provided. In Fig. 3, radiation sources 21, 22, 23, 24, and 25 are placed beneath tanks 26, 27, 28, 29 and 30 and provide gamma radiation detected by detectors 31, 32, 33, 34, and 35 disposed above each of the tanks. The output of detectors 31, 32, 33, 34, and 35 are fed to rate meters 36, 37, 38, 39, and 40, respectively, and the outputs of the rate meters are fed through resistors 41, 42, 43, 44, and 45, respectively, to terminals 46, 47, 48, 49, and 50 of rotary switch 51 which is driven by step motor 52. Step motor 52 also drives clutch mechanism 53 which connects motor 54 driven by servo amplifier 55 to ganged potentiometers 56, 57, 58, 59, or 60 in succession. These ganged potentiometers consist of linear potentiometers 61, 62, 63, 64, and 65 as shown each of which receive a constant voltage, as shown, and the slider of each of which is connected, as shown, to the various terminals of rotary switch 51. Also contained in these ganged potentiometers are non-linear potentiometers 66, 67, 68, 69 and 70 the wipers of which are connected through resistors 71, 72, 73, 74, and 75, as shown, to summing amplifier 76. The output of summing amplifier 76 is fed to indicator 77. Each of non-linear potentiometers 66, 67, 68, 69, and 70, receives a constant voltage, as shown, since the function of the wiper is to pick off a portion of this voltage depending upon the displacement of the wiper and the particular non-linear characteristics of each of the potentiometers. These non-linear characteristics are of course related to the geometry of the particular tank to which the particular potentiometer corresponds. The wiper of each of linear potentiometers 61, 62, 63, 64, and 65 feeds a portion of the constant voltage supplied to these linear potentiometers back to the input of servo amplifier 55 through resistors 78, 79, 80, 81, and 82, as shown, so that the displacement of each of the ganged potentiometers is caused to be proportional to the respective output of the various count rate meters. Since the operation of each one of the ganged potentiometers is successive, the position of the wiper of each non-linear potentiometer provides an output signal to the summing amplifier proportional to the mass of fluid in the particular tank to which the non-linear potentiometer corresponds. The output of summing amplifier is therefore proportional to the total mass of fluid in all the tanks.

In operation, the various radiation sources emit gamma rays which are detected by the various detectors through the fuel tank. The radiation source and the detectors are all placed outside the boundaries of the tanks so that the tanks do not have to be opened or sealed in any way incident to installation or operation of the fluid mass indicator of this invention.

Figure 4:
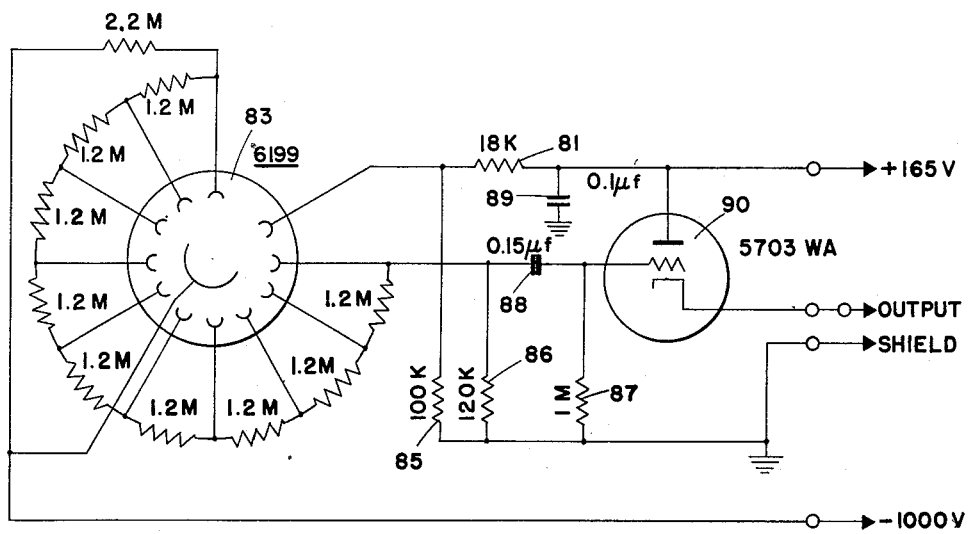
Fig. 4 is a circuit diagram of the detector portion of the invention.
Figure 5:
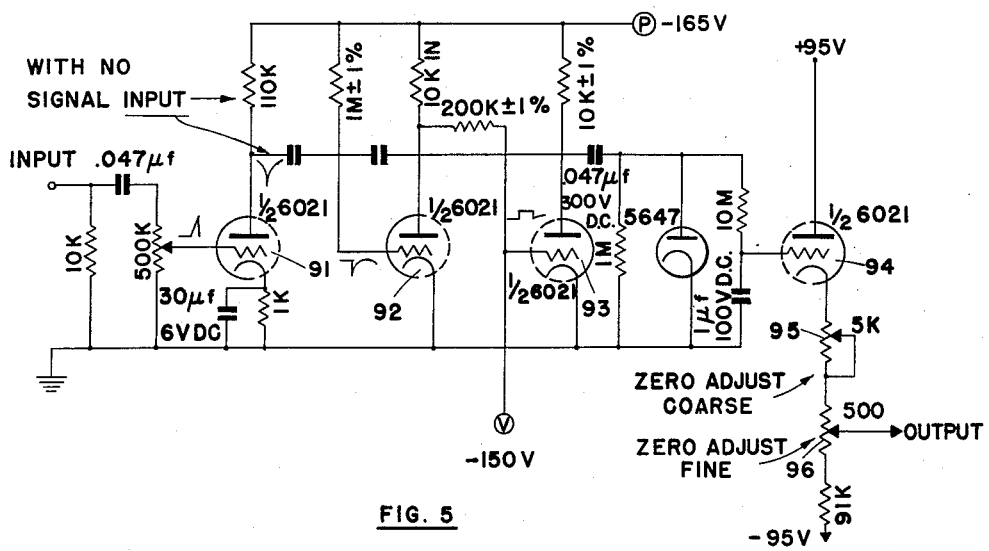
Fig. 5 is a circuit diagram of the counting rate meter portion of the invention.

Referring to Fig. 4, radiation from one of the sources falls upon photomultiplier tube 83 the output of which is connected through resistors 84, 85, 86, and 87 and condensers 88 and 89 to cathode-follower 90. Cathode-follower 90 and its associated circuitry are disposed as close as possible to the photomultiplier tube to reduce the effect of capacitive loading on the photomultiplier tube output. The output of the cathode-follower is a low impedance signal so that the rate meter portion of the invention may conveniently be disposed away from each one of the tanks. The rate meter arrangement is shown in Fig. 5 and consists principally of a triode amplifier 91, a monostable multivibrator including triodes 92 and 93 and an output cathode-follower 94 having variable resistors 95 and 96 in its output so that the output of the rate meter may be adjusted to zero for the condition where there is no fuel in the tank. The output of each one of the rate meters is fed through resistors 41, 42, 43, 44, or 45 to the terminals of rotary switch 51.

Assuming that rotary switch 51 is at terminal 46, as shown in Fig. 3, the signal from the rate meter is fed to the input of servo amplifier 55 through resistor 41 and the output of linear potentiometer 61 is fed to the input of servo amplifier 55 through resistor 78. If the voltage fed back to the input of servo amplifier 55 from linear potentiometer 61 differs in value from the signal fed from rate meter 36 through resistor 41, motor 54 turns in the direction required to adjust the output values from wiper 61 until these two voltages are equal. It should be noted that step motor 52 has actuated clutch mechanism 53 to connect the drive shaft of motor 54 with ganged potentiometer 56. At a time later determined by the interval of operation of step motor 52, rotary switch 51 is advanced to terminal 50 and, at the same time, clutch mechanism 53 is actuated by step motor 52 to connect the output shaft of motor 54 to ganged potentiometer 60. Now, the output signal from linear potentiometer 65 is fed back to the input of servo amplifier 55 through resistor 80. If, during the preceding interval, fluid has been removed from tank 30 a signal received by servo amplifier 55 through resistor 45 differs from that received through resistor 80 and hence, motor 54 will be driven in the direction required to restore balance between the two voltages. The output voltage received by the wiper of potentiometer 70 is correspondingly adjusted to reflect change in the contents of the tank.

After an interval determined by the interval of operation of step motor 52 the rotary switch 51 is advanced to terminal 49 and a similar operation occurs. Thus, the non-linear potentiometers are continuously being driven to positions whereby the voltage upon their wipers is directly proportional to the mass of fluid contained in the various tanks to which they correspond.

Where the geometry of the tanks is not unusual, that is, where the depth of fluid through which the radiation must proceed to reach the detector is linearly related to the mass of fluid in the tank, as would be the case in a parallelepipedal or cylindrical tank, a portion of the circuit between the count rate meter and the summing amplifier may be eliminated with the output of the count rate meter connected directly to a summing resistor network or to the summing amplifier.

Figure 6:
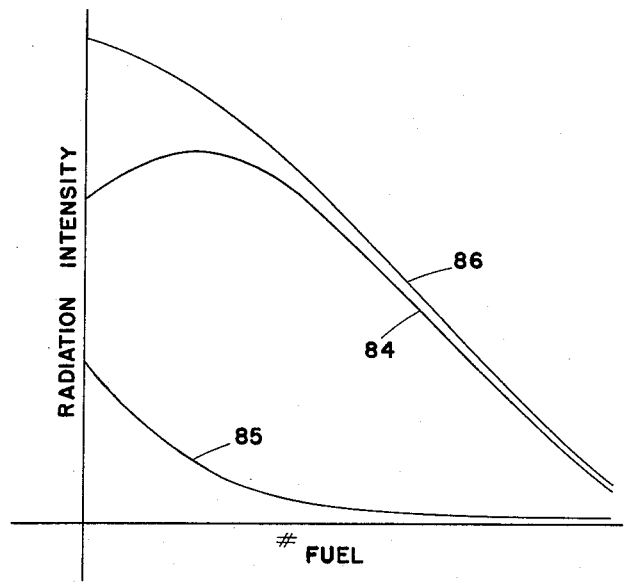
Fig. 6 is a plot of radiation intensity versus fuel mass in a tank.

In addition, an approximate measure of the fluid content of even an irregularly-shaped tank may be obtained without the use of a portion of the circuit between the count rate meter and the summing amplifier if additional radiation sources are disposed about each tank in the manner required to make the output of each detector a linear function of the fluid content of the tank. For example, referring to Fig. 7, there is shown a typical tank with a source 81 positioned directly below detector 82. An additional source 83 disposed at one extreme end of the tank also furnishes radiation to the detector. If the radiation intensity due to source 81 is plotted against the number of pounds of fuel of the tank, curve 84 of Fig. 6 results. Whereas if the radiation due to source 83 is plotted against the number of pounds of fuel in the tank, curve 85 results. Now, if both sources are employed, curve 86 which represents the addition of curves 84 and 85, results. It will be noted that curve 86 is more nearly linear than either curve 84 or 85 due to the complementing effect of the two curves. The addition of a very small amount of fuel in the bottom of the tank where a single detector 81 is utilized results in an increasing amount of radiation intensity as detected by the detector which accounts for the hump in curve 84. The hump is due to the fact that scattering of radiation directed toward the detector results in an increasing amount of radiation intensity as detected by the detector for small amounts of fuel. As the depth of fuel is increased, however, the attenuation more than balances the increased radiation received due to scattering and curve 84 takes a downward slope. Radiation received due to source 83, however, attenuates directly with the depth so that if the two curves are added and if source 83 is judiciously placed, resultant curve 86 is nearly a linear function.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for measuring the mass of fuel in a plurality of irregularly-shaped aircraft fuel tanks comprising a source of gamma radiation positioned adjacent one surface of each said tank, a radiation detector having an output in electrical form positioned adjacent an opposite surface of each said tank, and electrical means including means calibrated to the geometrical shapes of said tanks for summing the outputs of said detectors to thereby obtain a measure of the total mass of fuel in said plurality of tanks.

2. Means for measuring the mass of fluid in an irregularly-shaped container comprising a penetrating source of gamma radiation attenuated by said fluid, said source being positioned adjacent said container, radiation sensitive means having an output in electrical form positioned adjacent said container but not adjacent said source, servo means connected with said radiation sensitive means adapted to convert a non-linear signal from said radiation sensitive means into a linear output signal, and indicator means responsive to the output of said servo means indicate mass of fluid in said container.

3. Means for measuring the total mass of fluid in a plurality of irregularly-shaped containers comprising a source of gamma radiation positioned beneath each said container, radiation sensitive means having an output in electrical form positioned over each said container, a linear potentiometer for each said container, a non-linear potentiometer for each said container calibrated to have a ratio of output to shaft displacement equal to the ratio of the mass of fluid in said container to the output of said radiation sensitive means and connected to be driven with said linear potentiometer, servo means for successively driving each said linear potentiometer in proportion to the output of each said radiation sensitive means, and indicator means responsive to the sum of the outputs of said non-linear potentiometers to thereby indicate the total mass of fluid in said containers.

4. Means for measuring the mass of fluid in an irregularly-shaped container comprising one source of gamma radiation disposed outside said container and in the direction of a normal to the interface of said fluid, a radiation detector having an output in electrical form disposed to receive radiation through said container, a second source of gamma radiation disposed outside said container in a position such that said radiation is scattered substantially by said fluid before reaching said detector, and indicator means responsive to said radiation detector means and calibrated to take into account the geometric shape of said container to thereby measure the mass of fluid in said container.

5. Means for measuring the total mass of fluid in a plurality of irregularly-shaped tanks comprising at least one source of gamma radiation positioned adjacent one outer surface of each said tank, radiation sensitive means having an output in electrical form positioned adjacent an opposite outer surface of each said tank, servo means connected with said radiation sensitive means for each said tank, said servo means calibrated to provide an output signal in proportion to the mass of fluid in said tanks, and indicator means responsive to the sum of the outputs of said servo means to thereby indicate the total mass of fluid in said containers.

6. Means for measuring the total mass of fuel in a plurality of irregularly-shaped containers comprising at least one source of gamma radiation positioned outside each said container, radiation sensitive means having an output in electrical form positioned to receive said radiation through said container, means for summing the output of said radiation sensitive means, servo means connected to said summing means, potentiometer means connected to said servo means, said potentiometer means having a ratio of output to shaft displacement equal to the ratio of the output of said summing means to the mass of fluid in said tanks, and indicator means responsive to the output of said potentiometer means to thereby indicate the total mass of fuel in said containers.

7. Means for measuring the total mass of fuel in a plurality of irregularly-shaped containers comprising at least one source of gamma radiation positioned outside each said tank, radiation sensitive means having an output in electrical form positioned to receive said radiation through said container, means for summing the output of said radiation sensitive means, motive means connected to said summing means, potentiometer means calibrated to have an output in linear proportion to the mass of fluid in said containers, said potentiometer means being connected with said summing means to the input of said motive means, said potentiometer means being adapted to be driven by said motive means to balance the output voltage of said summing means, correspondingly changing the output voltage of said potentiometer means to thereby indicate the total mass of fuel in said tanks.

8. Means for measuring the total mass of fluid in a plurality of irregularly-shaped containers comprising at least one source of gamma radiation positioned outside each said container, radiation sensitive means having an output in electrical form positioned to receive said radiation through said container, potentiometer means connected to said radiation sensitive means and calibrated to have an output signal in linear proportion to the mass of fluid in said tanks, servo means for driving said potentiometer means, and indicator means responsive to the output of said potentiometer means to thereby indicate the total mass of fluid in said containers.

9. Means for measuring the mass of fluid in a plurality of irregularly-shaped containers, comprising at least one source of gamma radiation disposed outside each said container, radiation detector means having an output in electrical form disposed to receive said radiation through said container, servo means including potentiometer means connected with said detector means, said servo means being calibrated to account for the geometric shapes of said containers to linearize a non-linear input signal from said radiation detector means, and indicator means responsive to the output of said servo means to thereby measure the mass of fluid in said containers.

10. Means for measuring the total mass of fuel in a plurality of tanks which comprises a plurality of gamma radiation sources positioned outside each said tank, radiation detector means positioned to receive said radiation through each said tank, said radiation sources being selected and positioned to provide a signal to said detector in linear proportion to the fuel quantity in said tanks, and indicator means responsive to the output of said detectors to indicate the total mass of fuel in said tanks.

References Cited in the file of this patent

UNITED STATES PATENTS

| | | |
|---|---|---|
| 2,316,239 | Hare | Apr. 13, 1943 |
| 2,388,559 | MacIntyre | Nov. 6, 1945 |
| 2,411,712 | De Giers | Nov. 26, 1946 |
| 2,480,846 | Friedman et al. | Sept. 6, 1949 |
| 2,576,512 | Jones | Nov. 27, 1951 |
| 2,659,012 | Bromberg et al. | Nov. 10, 1953 |
| 2,674,695 | Grace | Apr. 6, 1954 |
| 2,765,410 | Herzog | Oct. 2, 1956 |